United States Patent
Haemmerle

(10) Patent No.: US 11,702,358 B2
(45) Date of Patent: Jul. 18, 2023

(54) METHOD AND APPARATUS FOR REPRODUCIBLY PRODUCING A PREFORM FOR GLASS FIBER MANUFACTURE

(71) Applicant: j-fiber GmbH, Jena (DE)

(72) Inventor: Wolfgang Haemmerle, Jena (DE)

(73) Assignee: J-FIBER GMBH, Jena (DE)

( * ) Notice: Subject to any disclaimer, the term of this patent is extended or adjusted under 35 U.S.C. 154(b) by 234 days.

(21) Appl. No.: 17/263,643

(22) PCT Filed: Jul. 30, 2019

(86) PCT No.: PCT/EP2019/070402
§ 371 (c)(1),
(2) Date: Jan. 27, 2021

(87) PCT Pub. No.: WO2020/025561
PCT Pub. Date: Feb. 6, 2020

(65) Prior Publication Data
US 2021/0309558 A1    Oct. 7, 2021

(30) Foreign Application Priority Data
Aug. 2, 2018  (DE) .......................... 102018118771.8

(51) Int. Cl.
*C03B 37/018*    (2006.01)

(52) U.S. Cl.
CPC .... *C03B 37/01807* (2013.01); *C03B 2201/31* (2013.01); *C03B 2207/87* (2013.01)

(58) Field of Classification Search
None
See application file for complete search history.

(56) References Cited

U.S. PATENT DOCUMENTS

| | | | |
|---|---|---|---|
| 4,220,460 A | * | 9/1980 | Partus ............... C03B 37/01413 261/DIG. 65 |
| 4,235,829 A | | 11/1980 | Partus |
| 4,276,243 A | * | 6/1981 | Partus .................. G05D 11/132 261/DIG. 65 |
| 4,412,853 A | | 11/1983 | Partus |
| 4,582,480 A | | 4/1986 | Lynch et al. |
| 6,135,433 A | | 10/2000 | Nurmi |

(Continued)

FOREIGN PATENT DOCUMENTS

| | | |
|---|---|---|
| CN | 102794136 A | 11/2012 |
| CN | 103572258 A | 2/2014 |

(Continued)

OTHER PUBLICATIONS

JP61151032A—Dialog Machine Translation Performed Nov. 16, 2022. (Year: 2022).*

(Continued)

*Primary Examiner* — Lisa L Herring
(74) *Attorney, Agent, or Firm* — Tarolli, Sundheim, Covell & Tummino L.L.P.

(57) ABSTRACT

The invention relates to a method and a device for producing a preform for glass fiber production. The method comprises the steps of providing a carrier gas with a desired, precisely adjusted temperature, loading the carrier gas with halide (Continued)

Figure 1:
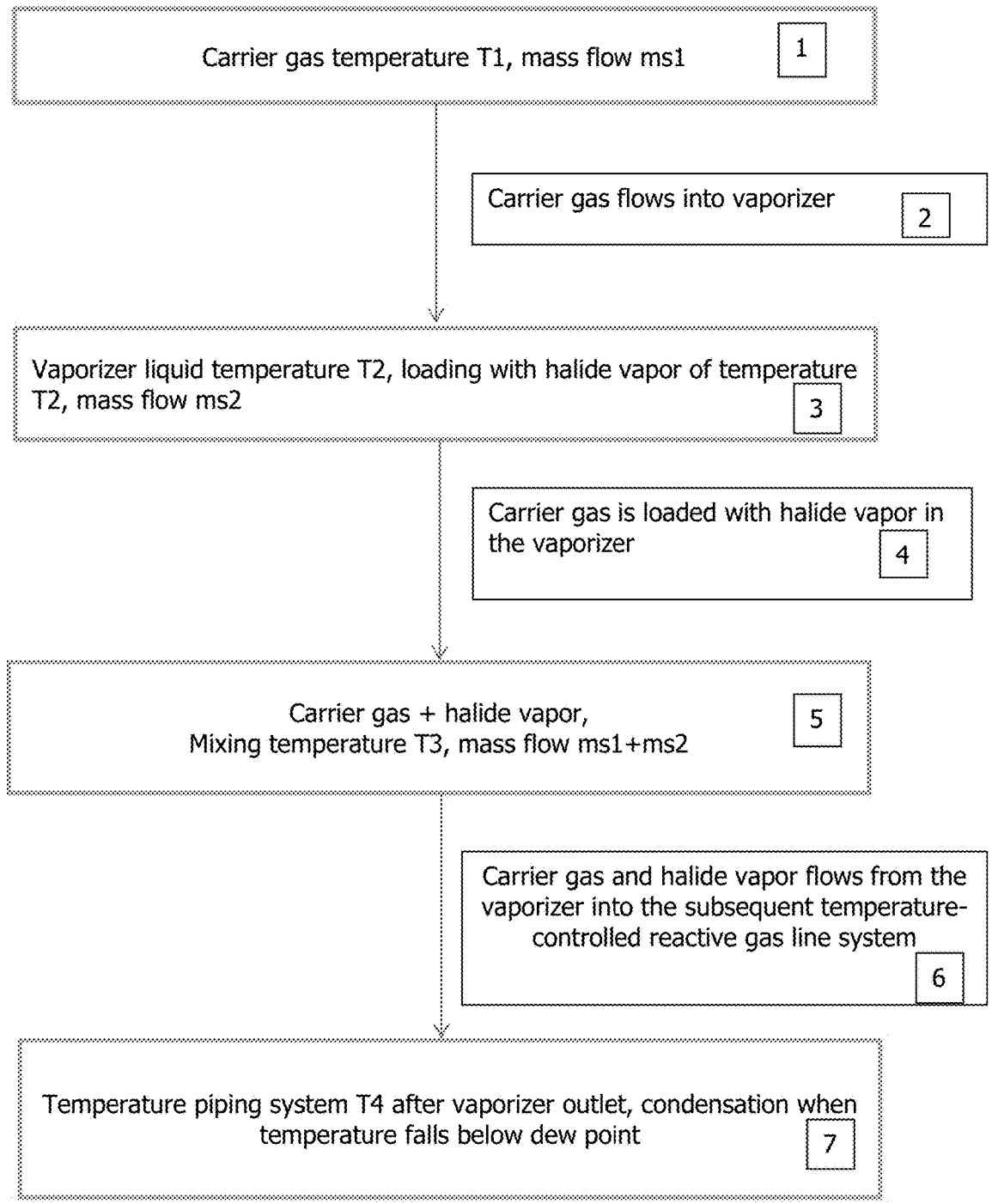

vapor, mixing the loaded carrier gas with additional gases, and producing the preform in a reaction chamber with substrate.

18 Claims, 4 Drawing Sheets

(56) References Cited

U.S. PATENT DOCUMENTS

| | | | |
|---|---|---|---|
| 6,161,398 | A | 12/2000 | Partus |
| 6,192,713 | B1 | 2/2001 | Zhang et al. |
| 6,376,010 | B1 * | 4/2002 | Blackwell ............... C03C 3/06 65/435 |
| 7,011,299 | B2 | 3/2006 | Curran |
| 2005/0069638 | A1 | 3/2005 | Kajala et al. |
| 2012/0298040 | A1 | 11/2012 | Woelk et al. |
| 2015/0167172 | A1 | 6/2015 | Woelke et al. |

FOREIGN PATENT DOCUMENTS

| | | | | |
|---|---|---|---|---|
| CN | 103803790 | A | 5/2014 | |
| DE | 69414044 | T2 | 4/1999 | |
| EP | 0635460 | A2 | 1/1995 | |
| EP | 0635460 | B1 | 10/1998 | |
| EP | 2527490 | B1 | 7/2016 | |
| JP | 61151032 | A * | 7/1986 | ....... C03B 37/01413 |
| JP | S61151032 | A | 7/1986 | |
| JP | 2005343714 | A | 12/2005 | |
| WO | 00/00442 | | 1/2000 | |

OTHER PUBLICATIONS

Suzanne R. Nagel et al. "An Overview of the Modified Chemical Vapor Deposition (MCVD) Process and Performance", IEEE Transactions on Microwave Theory and Techniques, vol. MTT-30, No. 4, Apr. 1982.

M.Minami, Vapor concentration control system for bubbling method, Horiba Technical Reports No. 41, 2013.

Warmelehre(Thermodynamik) article located at: http://www.physik.uni-halle.de/Fachgruppen/bio/Lehre/exphysbiochem/Waerme.pdf—Specifically p. 4—translation of p. 4 previously attached on Jun. 2, 2021—Accessible at Least as Early as Jun. 2, 2021.

NIST Chemistry WebBook SRD 69 "Germanium Tetrachloride" Publication located at: http://webbook.nist.gov/cgi/cboook.cgi?ID=C10038989&Units=S1&Mask=4#Thermo-Phase—Accessible at Least as Early as May 13, 2021.

Dockweiler Bubbler Systems HPL, HPS and ECO Series Publication located at: http://www.dockweiler.com/fileadmin/user_upload/PDF/Broschueren/DW_Bubbler-EN.pdf)—Accessible at Least as Early as May 13, 2021.

Molar Volume Wikepedia Publication located at: https://de.wikipedia.org/wiki/Molares_Volumen Accessible at Least as May 13, 2021.

Wikiwand—Taupunkt (Dewpoint) This Publication located at: http://www.wikiwand.com/de/Taupunkt Translation is Achieved By Hitting English in Upper Right Hand Corner—Accessible at Least as Early as May 13, 2021.

* cited by examiner

METHOD AND APPARATUS FOR REPRODUCIBLY PRODUCING A PREFORM FOR GLASS FIBER MANUFACTURE

RELATED APPLICATIONS

This application filed under 35 U.S.C § 371 is a national phase application of International Application Serial Number PCT/EP2019/070402 filed Jul. 30, 2019, which claims priority to German Patent Application No. 10 2018 118 771.8, filed on Aug. 2, 2018, the entirely of which are incorporated herein by reference.

The invention relates to a method and a device for producing a preform for glass fiber production. The method comprises the steps of providing a carrier gas with a desired, precisely set temperature, loading the carrier gas with preform precursors, mixing the loaded carrier gas with additional gases, and producing the preform in a reaction chamber with substrate.

TECHNICAL PRINCIPLES AND STATE OF THE ART

The transmission properties of optical fibers are continuously being subjected to higher demands in terms of transmission capacity. The transmission capacity of graded index multimode fibers is determined by the precision of the graded index refractive index profile. Even the slightest deviation from the desired refractive index profile in the range of a few $1*10^{-4}$ means that the currently highest multimode fiber quality level OM4 is not reached. This means that even small refractive index profile deviations reduce the yield of high-quality fibers.

For the reproducible production of high-quality gradient index fibers, the highest demands are therefore placed on the reactive gas supply in the preform manufacturing method. The reproducible loading of a carrier gas (dry oxygen for the production of low attenuation fibers), which passes through a liquid vaporizer (halide liquids e.g. $GeCl_4$, $SiCl_4$ or $POCl_3$), plays an outstanding role in the reactive gas supply.

A variety of arrangements and procedures have been proposed to improve the reproducibility of the loading of a carrier gas with a halide vapor. However, these suggestions for improvement largely relate to design modifications of the vaporizer structure itself or to the avoidance of condensation effects of the loaded carrier gas volume flow after leaving the vaporizer by heating the transport pipe system up to the reactor. However, the influence of the carrier gas temperature on a reproducible loading in a vaporizer system itself does not seem to have been investigated so far and no arrangements and procedures to eliminate the influence of carrier gas temperature variations seem to be proposed.

In the state of the art there are various suggestions for improving the loading of a carrier gas in a vaporizer system. All these improvements refer to the conditions in the vaporizer system and serve to correct preferably systematic deviations of the real loading from a complete loading. All of the systematic improvements of the load considered lead to systematic deviations of the load from the ideal, if the method control is suitable. Such systematic deviations in loading ultimately lead to systematic deviations in refractive index profile and core diameter during preform production. However, these systematic deviations can in principle be eliminated by systematic profile and core diameter corrections.

The patent specification U.S. Pat. No. 6,135,433 describes a method for generating a continuous saturated gas/vapor mixture by loading a carrier gas in a liquid vaporizer. The vaporizer system has the following characteristics:

Bubble generation through a bubble arrangement
Means for stabilizing the liquid level to a constant value
Control of the liquid temperature to a predetermined value by means of a special arrangement for cooling and heating the vaporizer liquid
Regulation of the pressure of the saturated carrier gas to a predetermined value.

To obtain a reproducible loading of the carrier gas, only the points bubble size and distribution, liquid level, vaporizer liquid temperature and vaporizer pressure are considered. With suitable method control, these influencing factors are systematic in preform production and can be corrected by changing the volume flow specifications in the preform production recipe. However, the random temperature fluctuations of the carrier gas during the coating method cannot be corrected and are not considered in U.S. Pat. No. 6,135,433. To avoid condensation of the vapor in the saturated gas/vapour mixture, column 7/line 8 suggests cooling the vaporizer liquid to a value below ambient temperature. As long as the temperature of the transport line from the vaporizer outlet to the application point is not below the temperature of the vaporizer liquid, condensation effects should not occur.

However, these requirements on the vaporizer system should not be sufficient to achieve a reproducible loading of the carrier gas on the one hand and to reliably avoid condensation effects after leaving the vaporizer on the other hand. Because the temperature of the carrier gas is not taken into account and because this means that an undefined interaction between carrier gas and vaporizer liquid and the pressure conditions at the vaporizer outlet are not taken into account, no reproducible loading can be achieved under the specified conditions.

Only by determining the dew point temperature at the vaporizer outlet can undesirable condensation effects in the downstream reactive gas transport line system be reliably clarified.

U.S. Pat. Nos. 4,235,829, 4,220,460, 4,276,243, 4,582,480, 7,011,299, and DE 69922728 disclose vaporizer systems in which the carrier gas is passed through one or two temperature-controlled chambers at different temperatures before entering the vaporizer system or vaporizer liquid, respectively.

In the context of the present invention, it was recognized that an improved apparatus and an improved method for loading in a vaporizer system, and ultimately for the production of a preform for the manufacture of glass fibers, can be provided, which even better prevents undesired condensation.

Based on the new findings, one aim of the present invention was to eliminate random factors influencing the temperature of the carrier gas and to provide methods for the exact control of the carrier gas temperature.

SUMMARY OF THE INVENTION

It was recognized that the use of temperature chambers, as proposed in the state of the art, cannot eliminate random factors influencing the loading and, in addition, no exact adjustment or exact control of the carrier gas temperature during the method is possible. Although a certain temperature increase is achieved with the proposed chambers, the final carrier gas temperature depends on the initial carrier gas temperature and is therefore subject to fluctuations as long as the initial temperature is not precisely controlled.

However, this is not proposed in the state of the art. Rather, carrier gases are usually stored at ambient temperature and this is subject to fluctuations.

In the context of the present invention, the importance of the temperature of the carrier gas before the vaporizer was recognized. The effect of carrier gas fluctuations on the load, the dew point temperature at the vaporizer outlet and uncontrolled condensations on the way from the vaporizer outlet to the reactor were investigated.

The estimations, calculations and considerations carried out within the scope of the present invention show that for a reproducible loading of the carrier gas in a liquid vaporizer system and to avoid uncontrolled condensation effects after leaving the vaporizer system, the following conditions should be met:

1. The carrier gas temperature at the vaporizer inlet must be so low that the carrier gas/vapor mixture never cools down again to temperatures below the dew point temperature at the vaporizer outlet during transport to the location of the reactor.
2. To ensure a reproducible halide load in the vaporizer, the carrier gas temperature fluctuations at the vaporizer inlet must be kept low and should not be greater than the permissible vaporizer liquid fluctuations. The temperature fluctuations can be compared with the liquid fluctuations on a percentage basis.

The invention thus relates to a method for producing a preform for glass fiber production, comprising the steps
a) providing an oxygen gas-containing carrier gas stream of temperature T0 and generating a carrier gas stream with a precisely adjusted temperature by increasing or decreasing the temperature T0 to a temperature T1 which is below the transport temperature, wherein the transport temperature corresponds to the lowest temperature value of the loaded carrier gas stream on the transport path of the loaded carrier gas stream from the vaporizer outlet of step (b) to the mixing chamber of step (d),
b) introducing the carrier gas stream from step (a) at temperature T1 into a vaporizer system comprising a vaporizer liquid at temperature T2 and at least one preform precursor, a vaporizer inlet and a vaporizer outlet,
c) loading the carrier gas stream with at least one preform precursor, preferably with halide vapor, in the vaporizer system by passing the carrier gas stream through the vaporizer liquid, the loaded carrier gas stream having the temperature T3 at the vaporizer outlet,
d) mixing the laden carrier gas stream from step (c) in a mixing chamber with one or more additional gases to obtain a mixed gas stream, whereby the transport temperature of the laden carrier gas stream must not drop below the dew point, and
e) producing a preform for glass fiber production in a reaction chamber containing a substrate, for example substrate tube or substrate rod, using the mixed gas stream from step (d).

The invention further relates to a device for producing a preform for the manufacture of glass fibres, preferably using a method according to one of the preceding designs, comprising
i) at least one carrier gas source which supplies carrier gas to two temperature control units, the temperature control units being suitable for heating and/or cooling the carrier gas
ii) a mixing unit connected to the temperature control units for obtaining the two carrier gas streams generated in the temperature control units, the mixing unit being capable of mixing the two carrier gas streams to generate a mixed carrier gas stream, the mixing unit being optionally arranged in a temperature control unit so that the temperature of the mixed carrier gas can be kept constant,
iii) a vaporizer with temperature control and pressure control and vaporizer inlet and vaporizer outlet, said vaporizer being capable of receiving a mixed carrier gas stream directly from the mixing unit, said vaporizer comprising a container comprising an immersion tube,
iv) a heatable piping system between the vaporizer outlet and a mixing chamber, the mixing chamber being configured to mix a charged carrier gas stream with one or more further gas streams from at least one further gas source; and
v) a reaction chamber for the production of a preform for the glass fiber.

DETAILED DESCRIPTION OF THE INVENTION

Industrial preform production requires large quantities of dry oxygen as carrier gas. For cost reasons, technical oxygen is used as the starting gas, which is passed through a catalytic oxidation unit (COU). In the COU, all hydrogen compounds are catalytically broken down at a temperature around 450° C. and oxidized to $H_2O$. The oxygen with the relatively high water content is then passed, for example, through a molecular sieve in which the water is removed down to a few 10 ppb. The dried oxygen then passes through a stainless steel piping system to the vaporizer inlet in the gas cabinet of the preform production machine. On its way from the COU to the gas cabinet of the preform production machine, the oxygen is subject to various temperature influences.

Since the oxygen lines are usually neither temperature controlled nor insulated, the oxygen temperature is influenced by the day/night temperature cycle as well as the summer/winter temperature cycle. The temperature variations for the oxygen are therefore a few tens of ° C. from about 15 to about 40° C.

The production time of a gradient index multimode preform is usually about 30 to 40 hours. About three quarters of the time the core layers are deposited and about one quarter of the time the internally coated substrate tube is collapsed. The start of preform production and thus the coating method relevant for refractive index profile production always varies from preform to preform in the day/night temperature cycle. The carrier gas temperature, which changes in the day/night cycle as well as in the summer/winter cycle, therefore always has a different influence on the loading with halides from preform to preform and therefore leads to a random and thus non-reproducible loading in the vaporizer system and thus to a non-reproducible reactive gas concentration and finally to a non-reproducible refractive index profile of the preform or fiber. The time-varying carrier gas-oxygen temperature is therefore an essential factor to improve the reproducibility of preform production when using vaporizer systems for halide loading and to increase the yield of multimode gradient index fibers of the highest quality grade OM4.

The temperature conditions of the carrier gas or the carrier gas/halide vapor mixture are explained in FIG. 1.

The loading of a carrier gas in a liquid vaporizer and the subsequent production of a preform is performed by the steps of providing a carrier gas at the desired temperature, loading the carrier gas with halide vapor, mixing the loaded carrier gas with additional gases, producing the preform by coating the inside of a substrate tube and then collapsing the tube.

The invention thus concerns the following forms of execution:
1. A method of producing a preform for glass fiber manufacture, comprising the steps of
    a) providing an oxygen gas-containing carrier gas stream of temperature $T0$ and generating a carrier gas stream with a precisely adjusted temperature by increasing or decreasing the temperature $T0$ to a temperature $T1$ which is below the transport temperature, wherein the transport temperature corresponds to the lowest temperature value of the loaded carrier gas stream on the transport path of the loaded carrier gas stream from the vaporizer outlet of step (b) to the mixing chamber of step (d),
    b) introducing the carrier gas stream from step (a) at temperature $T1$ into a vaporizer system comprising a vaporizer liquid at temperature $T2$ and at least one preform precursor, a vaporizer inlet and a vaporizer outlet,
    c) loading the carrier gas stream with at least one preform precursor, preferably with halide vapor, in the vaporizer system by passing the carrier gas stream through the vaporizer liquid, the loaded carrier gas stream having the temperature $T3$ at the vaporizer outlet,
    d) mixing the laden carrier gas stream from step (c) in a mixing chamber with one or more additional gases to obtain a mixed gas stream, whereby the transport temperature of the laden carrier gas stream must not drop below the dew point, and
    e) producing a preform for glass fiber production in a reaction chamber containing a substrate tube, using the mixed gas stream from step (d).
2. Method according to embodiment 1, wherein step (a) comprises the steps (a1)-(a3):
    a1) Provision of at least two carrier gas streams containing oxygen gas with the same or different temperature, preferably with the same temperature $T0$ and,
    a2) Heating and/or cooling of at least one carrier gas stream so that the at least two carrier gas streams have a different temperature
    a3) Introducing the at least two carrier gas streams into a mixing unit, both carrier gas streams being controlled by a mass flow controller each, and generating a mixed carrier gas stream with a temperature $T1$, the mixing unit being arranged in a temperature-controlled unit.
3. The method according to embodiment 1 or 2, wherein the carrier gas temperature $T1$ is set with an accuracy of +/−0.1° C., preferably +/−0.05° C.
4. The method according to one of the preceding embodiments, wherein the carrier gas temperature $T1$ is less than or equal to $T2$.
5. The method according to one of the previous embodiments, wherein the temperature $T1$ is lower than $T3$.
6. The method according to one of the preceding embodiments, wherein the temperature $T0$ is obtained by active or passive cooling of the carrier gas stream as an outlet stream of a catalytic oxidation unit.
7. The method according to one of the preceding embodiments, wherein the loaded carrier gas stream is passed after the vaporizer outlet through a heated pipe system to the mixing chamber.
8. The method according to one of the preceding embodiments, wherein the mixed gas stream containing oxygen, halide vapor and additional gas(es) is passed after the mixing chamber through a heated pipe system to the reaction chamber with the substrate.
9. The method according to one of the preceding embodiments, wherein an additional gas is a carrier gas stream loaded with at least one additional preform precursor.
10. The method according to one of the preceding embodiments, wherein an additional gas is a carrier gas stream which is loaded with at least one further preform precursor, wherein this loaded carrier gas stream has been generated by applying the method steps (a) and (b), using a vaporizer liquid with a temperature $T2'$ and at least one further preform precursor.
11. The method according to embodiment 9 or 10, wherein a further preform precursor is selected from $SF6$, $BCl3$, $GeCl4$ and $POCl3$.
12. The method according to one of the preceding embodiments, wherein the carrier gas in step (a) originates from a catalytic oxidation unit and a pressure reduction is carried out, for example to a pressure of 1-3 bar, before the temperature is increased or decreased in step (a).
13. Device for producing a preform for glass fiber production, preferably using a method according to one of the preceding embodiments, comprising:
    i) at least one carrier gas source which supplies carrier gas to two temperature control units, the temperature control units being suitable for heating and/or cooling the carrier gas;
    ii) a mixing unit connected to the temperature control units for obtaining the two carrier gas streams generated in the temperature control units, the mixing unit being capable of mixing the two carrier gas streams to generate a mixed carrier gas stream, the mixing unit being optionally arranged in a temperature control unit so that the temperature of the mixed carrier gas can be kept constant,
    iii) an vaporizer with temperature control and pressure control and vaporizer inlet and vaporizer outlet, said vaporizer being capable of receiving a mixed carrier gas stream directly from the mixing unit, said vaporizer comprising a container comprising an immersion tube,
    iv) a heatable piping system between the vaporizer outlet and a mixing chamber, the mixing chamber being configured to mix a loaded carrier gas stream with one or more further gas streams from at least one further gas source; and
    v) a reaction chamber for the production of a preform for the glass fiber production.
14. The device according to embodiment 13, wherein each one mass flow controller is present for controlling the carrier gas stream s into the mixing unit to set the desired pressure and desired temperature of the mixed carrier gas stream.
15. The device of embodiment 13 or 14, wherein the device does not have a mass flow controller downstream of the vaporizer.
16. The device according to one of the embodiments 13-15, wherein no device is provided to control the pressure of the gas stream downstream of the vaporizer outlet.
17. The device according to one of the embodiments 13-16, wherein a heatable piping system is provided between the mixing chamber of point (iv) of claim 12 and the reaction chamber of point (v) of claim 12.
18. The device according to one of the embodiments 13-17, wherein the reaction chamber contains a substrate, for example substrate tube or rod, preferably substrate tube for the production of a preform for glass fiber production. In a MCVD process a tube is generally used. However, the reactive gas supply can also be used for another process such as the OVD process. In the OVD process (Outside Vapor Deposition) the substrate is a rotating rod, usually made of ceramic.

Since the device according to the invention is preferably used to carry out the method according to the invention, the description of the method refers equally to the device and vice versa.

These method steps and the device means suitable for carrying out the steps are described in more detail below:

Supply of the Carrier Gas at the Desired Temperature

In a first step a carrier gas stream containing oxygen gas is provided. This comes from a carrier gas source, for example a gas bottle/gas tank or a catalytic oxidation unit. Preferably, the carrier gas consists of at least 99.9 volume percent oxygen.

In order to keep OH-impurities of the reactive gas oxygen as low as possible, the initially technical oxygen is usually subjected to catalytic cleaning before it is introduced into the vaporizer system of the gas cabinet of e.g. MCVD systems. During this method, the reactive gas oxygen flows over a catalyst at approximately 450° C. The H-containing compounds are catalytically cleaved and water molecules are formed, which are largely eliminated in a subsequent molecular sieve. Subsequent to the catalytic oxidation unit, a pressure reduction and pressure control, for example to 2 bar, as well as pre-cooling of the gas to T0 can be carried out. The temperature T0 is then set to the exact temperature T1. In other words, pre-cooling of the gas from about 450° C. to a value below 100° C. in the piping system, for example, does not represent an exact temperature setting.

In general, the oxygen dried in this way is neither tempered nor thermally insulated over a longer supply system and is thus fed into the vaporizer system largely without temperature control. The reactive gas oxygen can easily reach temperatures of around 40° C. when entering the gas cabinet, especially in summer at daytime, when fed through a pipe through non-air conditioned or non-tempered storage rooms.

According to the invention, the temperature T0 of the carrier gas stream is therefore set (heated or cooled) to an exact, preferably constant, value T1 below the transport temperature, for example to a value in the range of 18-35° C. or 18-23° C., or 20-25° C., further preferred to a temperature which is less than or equal to T2, further preferably T1 is less than T2. Thus, the resulting temperature T1 is independent of the temperature of the carrier gas T0 and in particular is not subject to temperature fluctuations depending on the outside temperature.

The term "constant temperature", as used here, refers to a constant temperature of X ° C.+/−0.5° C., preferably +/−0.1° C., more preferably +/−0.05° C. during the method or, for example, over a method duration of 1-4 hours or at least one hour.

The expression "exact temperature", as used here, refers to a temperature of X ° C.+/−0.5° C., preferably +/−0.1° C., further preferably +/−0.05° C., which is exactly set according to the requirements.

The temperature "T0" is the temperature of the provided oxygen gas containing carrier gas stream before the temperature is increased or decreased to T1.

The temperature "T1" is the temperature that can be measured at the vaporizer inlet.

The temperature "T2" is the temperature of the vaporizer liquid.

The temperature "T3" is the temperature that can be measured at the vaporizer outlet.

The "transport temperature" is the lowest temperature of the gas between vaporizer outlet and mixing chamber. If the temperature of the loaded carrier gas is not subject to any fluctuations, the "lowest temperature" corresponds to the temperature of the loaded carrier gas stream at any time during the transport route.

The term "dew point", as used herein, corresponds to the temperature at which condensation effects of the loaded carrier gas stream occur. The dew point can be recognized by the fact that there is a precipitation of the precursor(s) in the piping system.

Since the temperatures T1, T2, T3, as well as the transport temperature influence each other, usually a desired vaporizer liquid T2 and a transport temperature are selected and then T1 is adjusted accordingly. The temperature can be adjusted especially during conducting the method.

The temperature of the carrier gas stream can be adjusted in different ways as long as the desired temperature stability can be achieved.

The carrier gas stream is then provided at the desired temperature T1 at the vaporizer inlet, for loading with one or more precursors for a preform, preferably halides, to produce the main gas. Similarly, further process gases can be produced in separate vaporizers as additional gases for subsequent mixing with the main gas.

Preferably, the carrier gas stream is fed directly into the vaporizer inlet after the temperature has been set. Unnecessary pipelines should be avoided. Preferably, however, all lines from the point of the desired temperature to the vaporizer inlet should be insulated, or temperature should be controllable to the target temperature so that the temperature of the carrier gas stream to the vaporizer inlet does not change. It is particularly preferable that the carrier gas stream does not pass through a line section after the desired temperature has been set, in particular not through a temperature control chamber, which is temperature-controlled to a higher or lower temperature than the desired temperature. The method and the device according to the invention thus suffice with a maximum of one or even no temperature control chamber for controlling the temperature of the carrier gas stream lines.

Preferably, the carrier gas temperature at the vaporizer inlet is selected such low that the carrier gas/vapor mixture (i.e. the loaded carrier gas) never cools down again to temperatures below the dew point temperature at the vaporizer outlet on the transport route to the location of the reactor.

In order to ensure a reproducible halide load in the vaporizer, the carrier gas temperature fluctuations at the vaporizer inlet must be kept low and should not be higher than the permissible vaporizer liquid temperature fluctuations. The temperature fluctuations can each be compared with the liquid fluctuations on a percentage basis.

The device according to the invention achieves the desired temperature accuracy by first splitting the carrier gas stream from the carrier gas source or by providing separate carrier gas streams from different carrier gas sources.

A carrier gas stream is then cooled down in a temperature control unit if the initial temperature requires it, i.e. if the initial temperature does not already correspond to the target temperature, for example in such a way that the transport temperature or the temperature of the vaporizer liquid is clearly undercut (e.g. by 10 K/10 Kelvin). The second carrier gas stream is heated up in a temperature control unit if the initial temperature T0 requires it, i.e. the initial temperature does not already correspond to the target temperature, for example to a temperature above the transport temperature or vaporizer liquid temperature (e.g. by 10 K). However, at least one of the carrier gas streams is heated or cooled. Mixing the two carrier gas streams then provides the exact temperature T1. Preferred values for T1 are described elsewhere herein. It is also conceivable to use more than two carrier gas streams to set the temperature T1.

Each temperature control unit is followed by a mass flow controller, a pressure controller and a temperature sensor (Mass Flow Controller, MFC), which together can adjust a mixing ratio of the carrier gas streams to achieve the desired temperature accuracy and pressure by mixing the carrier gas streams. Preferably this temperature is measured or continuously controlled during the method.

For example, an MFC of type "Brooks SLA5840" can be used. Pressure measurement at desired points in the process control can be carried out, for example, using a pressure gauge of the type "Brooks 8607".

The components of the preform production device described here are connected to each other in a gas-tight manner, as is customary in this field. Unless otherwise described herein, the device may contain additional components to those described herein, such as mass flow controllers, sensors, chambers, feed lines, or similar.

For example, the desired carrier gas temperature can be achieved as follows The carrier gas stream from the carrier gas source, which may be subject to temperature fluctuations of, for example, 15 to 40° C. during storage, is first divided into two or more carrier gas streams.

A part of the carrier gas stream is now cooled down in such a way that the vaporizer temperature (e.g. 26° C.) is clearly undercut (e.g. the carrier gas stream can be cooled down to approximately 10° C.). The second part of the carrier gas stream is heated to a temperature of approximately 45° C. The temperature of the mixed carrier gas stream then lies between the temperatures of the two carrier gas streams. As mentioned above, a carrier gas stream obtained from the carrier gas source with the desired high or low temperature does not need to be cooled or heated.

Assuming a carrier gas volume flow of 1000 sccm (standard cubic centimeters per minute) at 23° C. when entering the vaporizer is aimed at. Behind each of the two temperature control units there is a mass flow controller (MFC) and then the carrier gas stream is recombined and the temperature of the combined gas stream is measured. The two MFC's ensure via temperature control that both the desired volume flow of 1000 sccm as well as the required temperature of the carrier gas stream of e.g. 23±0.05° C. are maintained. The carrier gas stream with the desired narrowly toleranced temperature can then be provided directly at the vaporizer inlet.

Loading the Carrier Gas with Halide Vapor

The loading of the carrier gas with halide vapor can be carried out using state-of-the-art processes and equipment. Preferably, a constant temperature control of the vaporizer or the vaporizer liquid (temperature T2), including the vapor space above the vaporizer liquid, is performed.

For example, the carrier gas is pressed into the lower area of the vaporizer liquid by means of an immersion tube and gas bubbles leave the immersion tube. The vaporizer liquid evaporates into the bubbles as the bubbles rise to the surface of the liquid. The vaporizer system is then a so-called bubbler system.

The vaporizer liquid contains at least one preform precursor, preferably halides, for example $SiCl_4$, $GeCl_4$ or $POCl_3$, preferably $GeCl_4$ in liquid or dissolved form. In general, "preform precursors" are substances or mixtures of substances that can be deposited on the substrate to subsequently form the preform.

The vaporizer temperature is preferably a value in the range of 20-33° C., preferably with a maximum fluctuation of ±0.1° C. or ±0.05° C., for example at 26±0.05° C. The vaporizer may be located in a temperature-controlled vaporizer space, wherein the temperature of the temperature-controlled vaporizer space is preferably slightly higher than the vaporizer temperature, for example 2-5 K higher.

The carrier gas is usually loaded until the carrier gas is saturated with liquid vapor. The typical design and operation of an vaporizer for preform production is described in U.S. Pat. No. 4,235,829.

A pressure measurement and pressure control of the loaded carrier gas/halide vapor at the vaporizer outlet is preferred.

Mixing the Carrier Gas with Additional Gases

When leaving the vaporizer outlet, the loaded carrier gas stream has a temperature T3, which depends at least on T1 and T2. It is decisive for the success of the method that the loaded carrier gas stream does not fall below the dew point after leaving the vaporizer outlet.

Therefore, the temperature T1 of the carrier gas is set or controlled to a value which is such low that the subsequently generated loaded carrier gas (carrier gas/vapor mixture) does not cool down to temperatures below the dew point temperature downstream of the vaporizer outlet on its transport path up to the substrate tube (i.e. sputtering reactor).

Based on the present findings, cooling the carrier gas temperature to values below the vaporizer temperature is important, but not yet the perfect solution, because significant temperature fluctuations below the vaporizer temperature with thermal interaction of the carrier gas bubbles in the vaporizer with the vaporizer liquid or halide vapor can also influence the loading.

In addition, it should therefore be ensured that after loading in the vaporizer and leaving the vaporizer, condensation of halide vapor is excluded with certainty. According to the invention, this can be achieved by heating the pipe system from the vaporizer outlet to the mixing chamber or reactor to such an extent that the dew point temperature at the vaporizer outlet to the reactor is safely exceeded. It is therefore preferable to heat the pipe system from the vaporizer outlet to the mixing chamber, for example to a temperature of 30-70° C.

The required safety is achieved in particular if the transport temperature of the gas/vapor mixture is so far above the dew point temperature that even with technically usual temperature fluctuations caused by temperature sensor drift, it is highly probable that the temperature will not fall below the dew point temperature. Therefore, the piping system should be heated to a temperature T4 which is at least 5-10 K above the vaporizer chamber temperature.

A simple increase of the temperature of the transport pipe system after the vaporizer outlet to a temperature at least above the dew point temperature of the gas/vapor mixture at the vaporizer outlet is not sufficient for a perfectly reproducible loading. In practice, the transport temperature should be so far above the dew point temperature that the requirement for safe exceeding of the dew point temperature at the vaporizer outlet is fulfilled even at temperature drifts of the temperature sensors, which always occur. This is the only way to avoid that the gas/vapor mixture cools down after leaving the vaporizer and that vapor components condense uncontrollably and thus change the reactive gas concentration in an undesired way.

Due to the deviations of the reactive gas concentration from the nominal value, the concentration of the layers deposited in the MCVD process and thus the refractive index profile is disturbed. Therefore, the temperature of the room in which the vaporizer is located should be at least 2-10 K above a calculated dew point for the loaded carrier gas and the transport temperature up to the mixing chamber or reaction chamber should always be above the dew point.

Equally insufficient for reproducible loading is the strengthening of the thermal interaction in the vaporizer between the rising carrier gas bubbles and the vaporizer liquid or between the carrier gas bubbles and the evaporated halide liquid.

Even a targeted utilization of the thermal interaction of the carrier gas bubbles with the vaporizer liquid or the formed vapor does not provide a reproducible loading at varying carrier gas temperature T1. This is particularly aggravated if, as in the production of graded index preforms, the loading channel (GeCl4) has to be operated with extremely different carrier gas volume streams (volume flow changes by a factor of about 100) over the coating time. In addition to the disturbing change of the carrier gas temperature, there is also the change of the thermal interaction of the carrier gas with the vaporizer liquid due to the different number of gas bubbles, bubble size and bubble residence time in the vaporizer liquid.

After the loaded carrier gas has been fed into the mixing chamber without condensation, it can be mixed with one or more additional gases. Before the loaded carrier gas is deposited or thermally decomposed in the locally heated substrate tube, additional gases, such as helium, oxygen and other preform precursors, such as $SF_6$, $BCl_3$, $GeCl_4$ and/or $POCl_3$, can be added to the loaded carrier gas stream in the mixing chamber.

In one embodiment (see FIG. 4), the further preform precursor(s), in particular halide gases, are produced using the method according to the invention. This means that the preform precursor(s) are also produced starting from a carrier gas and loading it using steps (a) to (c) before being mixed with the other gases in the mixing chamber.

Figure 4:
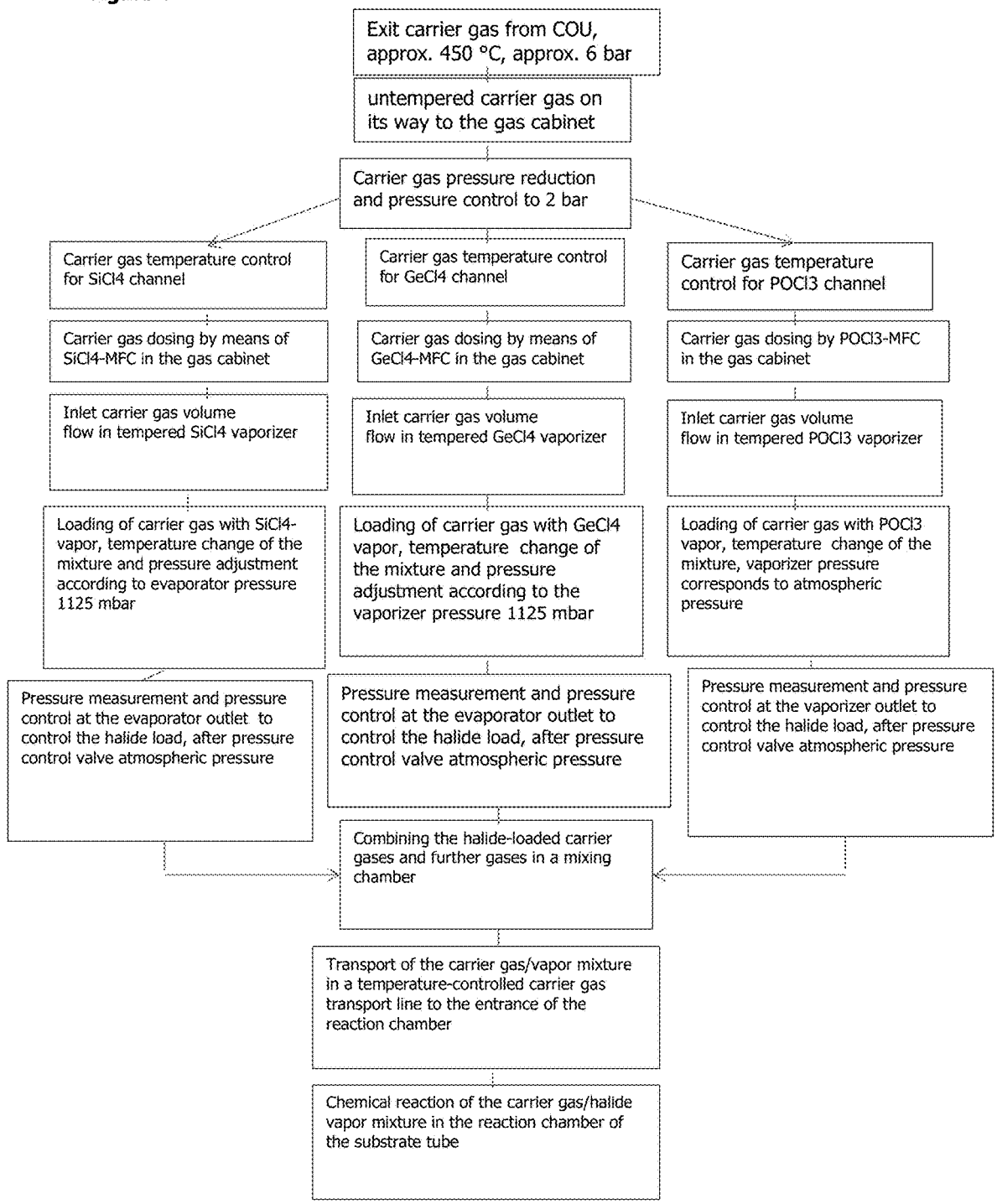

For example, two or three, preferably three, halides selected from $SiCl_4$, $GeCl_4$, $POCl_3$ can be used to create the additional preform precursor(s) (see FIG. 4).

For example, the precursor(s) for the main gas and/or additional gases can be selected from the group consisting of $SiCl_4$, $GeCl_4$, $POCl_3$, $SF_6$, $BCl_3$.

Due to the carrier gas or loaded carrier gas being exactly controlled according to the invention, no mass flow controller is necessary after the exit from the vaporizer outlet to the entrance into the mixing chamber for mixing the loaded carrier gas stream with one or more additional gases, i.e. preferably no mass flow controller is used at this point. The pressure at the vaporizer outlet can for example have a value in the range of 1000-1300 mbar, e.g. 1125+/−3 mbar.

According to the invention, the carrier gas stream temperature T1 is selected so low that the temperature does not fall below the dew point. Nevertheless, measures can be provided to heat the piping system after leaving the vaporizer outlet. However, the method and the device according to the invention offer the advantage that the carrier gas temperature T1, and thus also T2, can be lowered if necessary to control the method. The mixing chamber can itself be located in a tempered room, whereby the temperature of the tempered room is preferably somewhat higher than that of the tempered vaporizer room, for example 2-5 K higher.

The pipe system from the mixing chamber to the reaction chamber with the substrate tube can be heated, for example to a temperature of 30-70° C. The heating after the mixing chamber depends on the volume flow of the additional gases/vapors and their temperatures.

The calculation of the dew point or its influence is explained below.

Calculation of the Dew Point

The daily and seasonal temperature fluctuations of the carrier oxygen of up to approximately 25 K influence the halide load in the vaporizer through thermal interaction of the carrier gas bubbles with the precisely tempered vaporizer liquid, through which the gas bubbles rise. Even if this interaction is neglected, the loading as a mixing process of the mass of the carrier gas with the mass of the evaporating halide liquid can influence the loading and condensation conditions at the vaporizer outlet.

If, for example, the vaporizer temperatures of the MCVD systems are at 26±0.05° C. and the temperature of the subsequent PFA-piping system to the mixing chamber is only about 1 to a maximum of 3K above the vaporizer temperature, undesirable condensations of halide vapor may occur after leaving the vaporizer in addition to the non-reproducible loading, depending on the dew point temperature of the gas/vapor mixture.

The amount of halide vapor that can be contained in the loaded carrier gas is limited. The warmer the carrier gas, the more halide vapor can be contained in the loaded carrier gas. The relative halide content indicates how much of the maximum halide vapor content (saturation content) the carrier oxygen contains. Since the maximum halide content increases with rising temperature, the relative halide content decreases with rising temperature and vice versa.

The dew point is used as a criterion for calculating the critical carrier gas/halide vapor temperatures with regard to condensation. The dew point indicates the temperature at which the halide vapor contained in the carrier gas begins to condense. The dew point temperature is defined as the temperature at which the actual halide vapor content in the loaded carrier gas is the maximum (100% relative halide vapor content).

Basis of the dew point calculation for the GeCl4 doping channel is the vapor formula for GeCl4 according to literature reference 1:

$$pDD = 10 \wedge \left\{ A - \left[ \frac{B}{(T-C)} \right] \right\}$$

Figure 2:
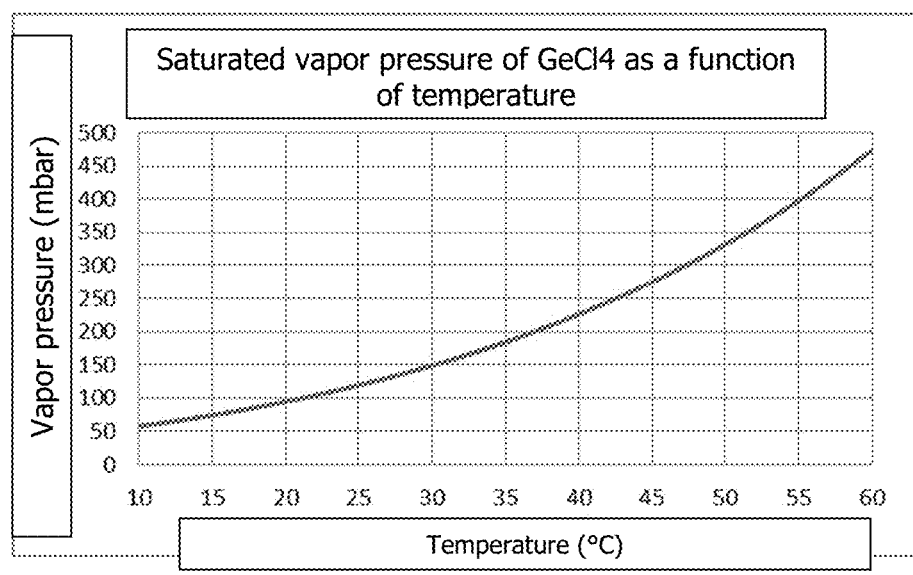

P: Vapor pressure GeCl4 in bar
A: 3.68225
B: 1080.101
C: −63.588
T: temperature in K The vapor pressure of GeCl4 as a function of temperature is shown in FIG. 2. In the case of the usual vaporizers with a simple immersion tube for introducing carrier gas into the vaporizer liquid and the usual liquid filling heights from the vaporizer bottom of up to approximately 30 cm (see e.g. literature reference 2 of the supplier Comp. Dockweiler) with an vaporizer volume of e.g. 10 l, the dwell time of the carrier gas bubbles in the vaporizer liquid is usually in the range of seconds.

In this short time only a limited heat exchange between the gas bubbles and the surrounding liquid takes place, so that in the worst case the gas bubble temperature only approximates insignificantly to the temperature of the liquid depending on the bubble size.

In graded index multimode preform manufacturing, the parabolic refractive index profile of the preform core is generated by the changing germanium concentration in the successive layers. To generate the increasing germanium concentration in the core layers again, the carrier oxygen stream and thus the gas/vapor mixture loaded with GeCl4 vapor is monotonically increased in the evaporator. Depending on the vaporizer temperature and the vaporizer pressure, the increasing carrier oxygen stream increases for example from 10 sccm in the first core layer to 1000 sccm in the last core layer. Due to the $O_2$ volume flows, which differ by a factor of about 100 over the coating time, passing through the vaporizer and being loaded with GeCl4 vapor, the number of bubbles, bubble size and the residence time of the bubbles in the vaporizer liquid also change. The thermal interaction between the rising carrier oxygen bubbles and the vaporizer liquid thus changes not only with the carrier gas temperature but also due to the extremely different number of bubbles, bubble size and residence time in the vaporizer liquid of the GeCl4 channel. The rising bubbles form a vertical bubble channel whose thermal properties change very strongly with the gas volume flow.

Usually a constant gas volume flow is used for core deposition for the $SiCl_4$ channel.

The thermal interaction of the carrier gas bubbles with the vaporizer liquid thus only changes with the carrier gas temperature and not with different gas volume flows in the vaporizer liquid.

In example 1, an estimation of the carrier gas/halide vapor temperature is performed for the case without gas/liquid interaction. The findings from the estimations and calculations were used as a basis for the method and device according to the invention.

Generating the Preform by Deposition in a Substrate Tube and Subsequent Collapse A preform is an enlarged image of the later cross-section of optical fibers. They contain the starting materials in their arrangement and structure. The preform can be produced using processes known in the art by deposition or thermally decomposing of germanium from the loaded carrier gas. A preferred process is the MCVD process (Modified Chemical Vapor Deposition). See for example S. R. Nagel et al. "An Overview of the Modified Chemical Vapor Deposition (MCVD) Process and Performance", IEEE Transactions on Microwave Theory and Techniques, Vol. MTT-30, No. 4, April 1982.

The substrate is, according to the invention, a glass tube. After the desired deposition of one or more layers on the inside of the substrate tube and the subsequent collapse of the tube into a solid rod, the rod-shaped preform is obtained. If a substrate tube is used, this is collapsed towards the end of the method by increasing the temperature, whereby the substrate tube then encloses the deposited layers.

The device has the heating elements (e.g. a burner) necessary for thermal decomposition of the loaded carrier gas.

The preform is preferably used for the production of fibers of the OM4 multimode fiber quality level and has the necessary quality.

The invention also relates to the use of the device according to the invention to produce a preform for the production of glass fibers.

The present disclosure will be further explained by means of figures:

FIG. 1: Temperature ratios of the carrier gas or carrier gas/halide vapor mixture, with the following steps shown: 1: Providing a carrier gas temperature with desired, exact temperature T1 and mass flow ms1; 2: Carrier gas flows into evaporator; 3: Vaporizer liquid temperature T2, loaded with halide vapor of temperature T2 and mass flow ms2; 4: Carrier gas is loaded with halide vapor in the vaporizer; 5: carrier gas+halide vapor, mixing temperature at the vaporizer outlet (T3), mass flow ms1+ms2; 6: carrier gas and halide vapor flows from vaporizer into the following tempered reactive gas piping system; 7: temperature of piping system T4 after vaporizer outlet, condensation if temperature falls below dew point FIG. 2: Vapor pressure of GeCl4 as a function of temperature.

Figure 3:
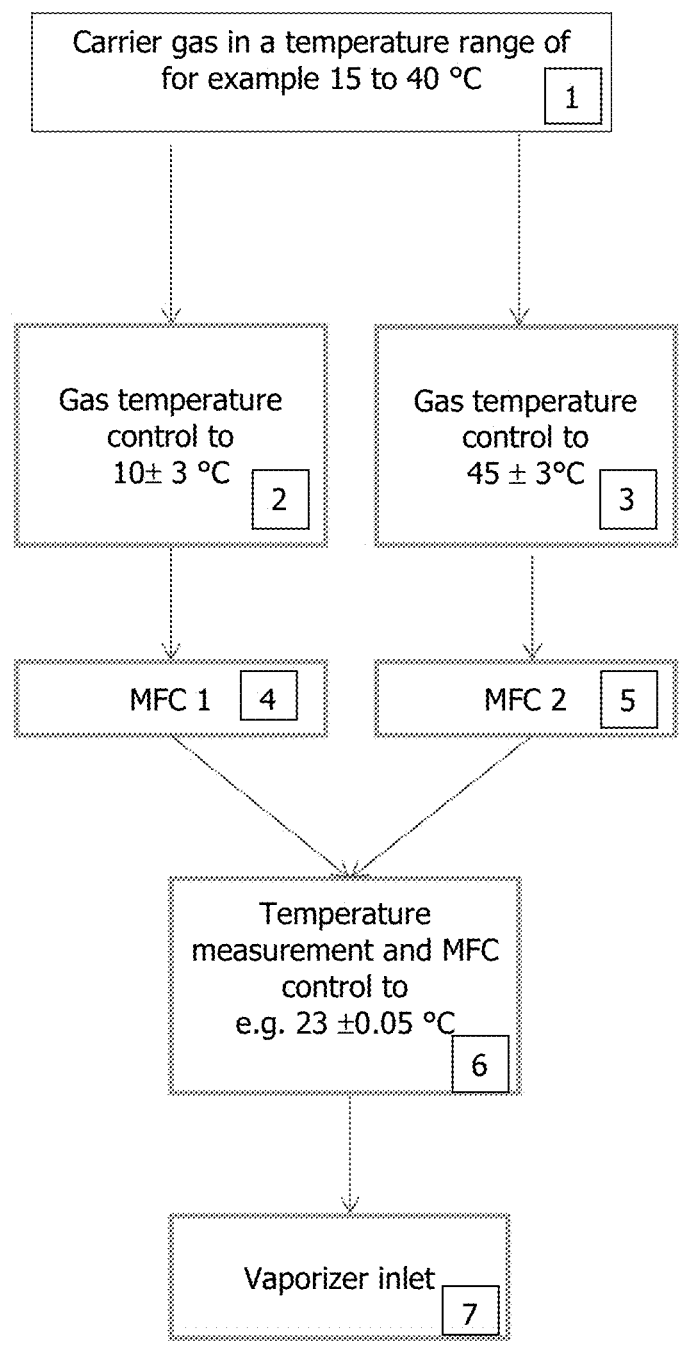

FIG. 3: Schematic structure of an arrangement for the temperature control of the carrier gas stream for a reproducible loading in the vaporizer of preform production systems, where the following steps are shown: 1: Carrier gas in the temperature range of e.g. 15 to 40° C. (T0); 2: Gas temperature control to 10±3° C.; 3: Gas temperature control to 45±3° C.; 4: MFC 1; 5: MFC 2; 6: Temperature measurement and MFC control to e.g. 23±0.05° C.; 7: Vaporizer inlet FIG. 4: Sketch of the carrier gas stream according to the invention from the COU to the reaction site of the reactants in the substrate tube.

EXAMPLES

Example 1—Estimation of the Carrier Gas/Halide Vapor Temperature

In the following an estimation of the carrier gas/halide vapor temperature for the case without gas/liquid interaction is carried out. A heating/cooling of the carrier gas when passing through the vaporizer liquid by interaction is neglected and only a mixing temperature of the thermally unaffected carrier gas with the halide vapor at the vaporizer temperature level is considered. Both the carrier gas and the halide vapor are considered as ideal gases. This is common in the temperature range of interest from 10 to 50° C. as well as in the pressure range of interest around 1 bar. 1000 sccm $O_2$ are passed through the vaporizer ($GeCl_4$ channel, vaporizer temperature 26° C., vaporizer pressure at vaporizer outlet 1125 mbar), temperature of the piping system from vaporizer outlet 27.0° C. to the mixing chamber. The following calculations are based on a reference time of 1 min in order to be able to make the various estimates.

The further explanations are limited to the $GeCl_4$ channel in the gas cabinet of a MCVD system. However, the contents of the explanations can also be transferred to the other vaporizer channels $SiCl_4$ and $POCl_3$.

For the calculation of the molar volume under the different temperature and pressure conditions the equation from literature reference 3 was used.

The loading of a carrier gas volume flow (in the example: $O_2$) in the vaporizer system under the assumption of a complete loading is calculated according to literature reference 4:

$$\dot{V}(GeCl4) = \frac{pDD * \dot{V}(O2)}{(P(\text{vaporizer}) - pDD)}$$

$\dot{V}$ (GeCl4): GeCl4 volume flow
$\dot{V}$(O2): Carrier oxygen volume flow
pDD: Vapor pressure GeCl4
P(vaporizer): Pressure at vaporizer outlet The calculation of the mixing temperature is done according to literature reference 5:

$$T_M = \frac{m_1 c_1 T_1 + m_2 c_2 T_2}{m_1 c_1 + m_2 c_2}$$

Table 1 shows the calculated mixture temperatures TM at the vaporizer outlet assuming no heat exchange between carrier gas and vaporizer liquid for the different carrier gas temperatures.

The table also shows how the temperature of the gas/vapor mixture and the GeCl$_4$ content x depends on the carrier gas and vaporizer temperature:

TABLE 1

Mass of the carrier gas O$_2$ at different gas temperatures, mass of the loaded GeCl$_4$ vapor at two different vaporizer temperatures and a uniform vaporizer pressure of 1125 mbar, mixing temperature of the carrier gas/GeCl$_4$ vapor mixture with neglected thermal interaction.

| Temperature O2 (° C.) | Gas mass O2 (g) | Vaporizer temperature GeCl4 (° C.) | vapor mass GeCl4 (g) | Temperature gas/vapor mixture (° C.) | x = m(GeCl4)/ m(O2) |
|---|---|---|---|---|---|
| 40 | 1.383 | 26 | 1.213 | 34.40 | 0.878 |
| 30 | 1.428 | 26 | 1.213 | 28.43 | 0.850 |
| 26 | 1.447 | 26 | 1.213 | 26.00 | 0.838 |
| 20 | 1.477 | 26 | 1.213 | 22.31 | 0.822 |
| 10 | 1.529 | 26 | 1.213 | 16.02 | 0.794 |
| 40 | 1.383 | 36 | 1.935 | 37.94 | 1.400 |
| 36 | 1.401 | 36 | 1.935 | 36.00 | 1.382 |
| 30 | 1.428 | 36 | 1.935 | 33.04 | 1.355 |
| 20 | 1.477 | 36 | 1.935 | 27.98 | 1.310 |
| 10 | 1.529 | 36 | 1.935 | 22.75 | 1.265 |

The PFA piping system at the outlet of the vaporizer within the vaporizer chamber is, for example, tempered to only 27° C. Since the mixture temperature of the carrier oxygen/GeCl$_4$ vapor mixture is sometimes significantly higher than the temperature of 27.0° C. of the line system connected after the vaporizer outlet, the carrier gas/vapor mixture will continue to cool down until the mixing chamber. To quantify the risk of condensation, the dew point at the vaporizer outlet is now calculated.

The carrier gas can be loaded with different amounts of halide vapor depending on the carrier gas temperature. The dew point temperature is a measure of the temperature at which the halide begins to condense. At the dew point, the carrier gas is by definition saturated with vapor.

The gas/vapor mixture as a function of the GeCl$_4$ content x and the pressure at the vaporizer outlet P is described by the following equation (A, B, C are coefficients of the GeCl4 vapor pressure formula according to literature reference 1):

$$T\tau = \frac{B}{A - \log 10 \left[ \frac{x * P}{(6,702 + x)} \right]} - C$$

Tτ: Dew point temperature (in K)
A: 3.68225
B: 1080.101
C: −63.588
P: Pressure at vaporizer outlet (in bar)
x: GeCl$_4$ vapor content (x=mGeCl$_4$/mO$_2$)

The equation was derived using the system of formulas in literature reference 6 and the vapor pressure formula from literature reference 1.

If the gas/vapor mixture is cooled below the dew point temperature, condensation of the GeCl$_4$ vapor occurs, which leads to uncontrolled doping and thus refractive index fluctuations in the deposited core layers.

The following table shows the dependence of the dew point temperature at the vaporizer outlet on the GeCl$_4$ content x of the vapor-gas mixture and different pressures P at the vaporizer outlet.

TABLE 2 expected condensation effects at the outlet of the vaporizer system at a gas/vapor transport pipe system temperature of 27° C. and at different GeCl4 contents x caused by different carrier gas temperatures and vaporizer temperatures at two different vaporizer pressures P.

| x = m(GeCl4)/m(O2) | Vaporizer pressure P at outlet (mbar) | Tτ (° C.) | Condensation at temp. of piping system after vaporizer at 27.0° C. |
|---|---|---|---|
| 0.8 | 1125 | 25.07 | No |
| 0.9 | 1125 | 27.41 | Yes |
| 1.0 | 1125 | 29.51 | Yes |
| 1.1 | 1125 | 31.42 | Yes |
| 1.2 | 1125 | 33.17 | Yes |
| 1.3 | 1125 | 34.78 | Yes |
| 0.8 | 1000 | 22.49 | No |
| 0.9 | 1000 | 24.78 | No |
| 1.0 | 1000 | 26.83 | No |
| 1.1 | 1000 | 28.70 | Yes |
| 1.2 | 1000 | 30.41 | Yes |
| 1.3 | 1000 | 31.98 | Yes |

The method according to the invention is described below with reference to FIG. 4:

After the carrier gas has left the catalytic oxidation unit (COU), it is fed to the gas cabinet without temperature control. There the pressure is reduced and regulated to 2 bar. After the pressure reducer and pressure regulator, the carrier gas usually has a temperature between 15 and 40° C. The carrier gas is then fed into one or more channels to produce a main gas and optionally one or more process gases. According to step (a), the carrier gas is then tempered before entering the vaporizer at a temperature lower than the temperature of the loaded carrier gas stream at the vaporizer outlet. The carrier gas is introduced into the vaporizer liquid through a tube in the vaporizer to be loaded with the precursor(s). Then the main gas and the additional gases are mixed without falling below the dew point. The mixed gas can be fed into the reaction chamber to produce the preform.

CITED REFERENCES

Reference 1 http://webbook.nist.gov/cgi/cbook.cgi?ID=C10038989&Units=SI&Mask=4#Thermo-Phase

Reference 2 http://www.dockweiler.com/fileadmin/user_upload/PDF/Broschueren/DW_Bubbler_EN.pdf Reference 3 https://de.wikipedia.org/wiki/Molares_Volumen

Reference 4

M. Minami, Vapor concentration control system for bubbling method, Horiba Technical Reports No. 41, 2013

Reference 5 http://www.physik.uni-halle.de/Fachgruppen/bio/Lehre/ex-physbiochem/Waerme.pdf, page 4

Reference 6 http://www.wikiwand.com/de/Taupunkt
U.S. Pat. Nos. 4,235,829, 4,220,460, 4,276,243, 4,582,480, 6,135,433, 7,011,299, DE 69922728, U.S. Pat. No. 4,412,853
R. Nagel et al. "An Overview of the Modified Chemical Vapor Deposition (MCVD) Process and Performance", IEEE Transactions on Microwave Theory and Techniques, Vol. MTT-30, No. 4, April 1982

The invention claimed is:

1. Method for producing a preform for glass fiber production, comprising the steps
   a1) providing at least two oxygen gas-containing carrier gas streams with the same or different temperature, and
   a2) heating and/or cooling of at least one oxygen gas-containing carrier gas stream of said at least two oxygen gas-containing carrier gas streams so that said at least two oxygen gas-containing carrier gas streams have a different temperature,
   a3) Introducing said at least two oxygen gas-containing carrier gas streams into a mixing unit, the mixing unit being arranged in a temperature-controllable unit, wherein said at least two oxygen gas-containing carrier gas streams are each controlled by one mass flow controller, and producing a mixed carrier gas stream with a precisely set temperature $T1$,
   b) introducing the mixed carrier gas stream from step (a3) at temperature $T1$ into a vaporizer system comprising a vaporizer liquid at temperature $T2$ and at least one preform precursor, a vaporizer inlet and a vaporizer outlet,
   c) loading the mixed carrier gas stream with at least one preform precursor to form a loaded carrier gas stream in the vaporizer system by passing the mixed carrier gas stream through the vaporizer liquid, wherein the loaded carrier gas stream has the temperature $T3$ at the vaporizer outlet,
   d) mixing the loaded carrier gas stream from step (c) in a mixing chamber with one or more additional gases to obtain a mixed gas stream, and
   e) producing a preform for glass fiber production in a reaction chamber containing a substrate tube, using the mixed gas stream from step (d), and wherein the temperature $T1$ is below a transport temperature $T4$, wherein the transport temperature $T4$ corresponds to the lowest temperature value of the loaded carrier gas stream, on a transport path of the loaded carrier gas stream from the vaporizer outlet of step (b) across the mixing chamber of step (d), up to the reaction chamber, and wherein the transport temperature $T4$ is maintained above the dew point at the vaporizer outlet.

2. The method according to claim 1, wherein the at least two oxygen gas-containing carrier gas streams in step (a1) have the same temperature $T0$.

3. The method according to claim 1, wherein the temperature $T1$ is adjusted with an accuracy of +/−0.1° C. in view of a target temperature.

4. The method according to claim 1, wherein the temperature $T1$ is less than or equal to the temperature $T2$.

5. The method according to claim 2, wherein the temperature $T0$ is obtained by active or passive cooling of one oxygen gas-containing carrier gas stream as an outlet stream of a catalytic oxidation unit.

6. The method according to claim 1, wherein the loaded carrier gas stream is passed after the vaporizer outlet through a heated conduit system to the mixing chamber.

7. The method according to claim 1, wherein an additional gas is a carrier gas stream loaded with at least one further preform precursor.

8. The method according to claim 1, wherein at least one of the additional gases of step (d) comprises a carrier gas stream loaded with a further preform precursor to form at least one additional loaded carrier gas stream, wherein this additional loaded carrier gas stream is generated by passing an additional carrier gas stream through an additional vaporizer system containing an additional vaporizer liquid (precursor) having a temperature $T2'$.

9. The method according to claim 8, wherein the further preform precursor is selected from $SF_6$, $BCl_3$, $GeCl_4$ and $POCl_3$.

10. The method according to claim 1, wherein one oxygen gas-containing carrier gas stream in step (a1) originates from a catalytic oxidation unit and a pressure reduction is carried out before the temperature is increased or decreased in step (a2).

11. Device for producing a preform for glass fibre production comprising:
   i) at least one carrier gas source which supplies carrier gas to two temperature control units, wherein the temperature control units are suitable for heating and/or cooling the carrier gas;
   ii) a mixing unit connected to the temperature control units for obtaining two carrier gas streams generated in the temperature control units, wherein the mixing unit is capable of mixing the two carrier gas streams to generate a mixed carrier gas stream,
   iii) a vaporizer with temperature control and pressure control and vaporizer inlet and vaporizer outlet, wherein the vaporizer is capable of receiving said mixed carrier gas stream directly from the mixing unit, wherein the vaporizer comprises a container comprising an immersion tube,
   iv) a heatable piping system between the vaporizer outlet and a mixing chamber, wherein the mixing chamber is configured to mix a loaded carrier gas stream with one or more further gas streams from at least one further gas source to obtain a mixed gas stream; and
   v) a reaction chamber for the production of a preform for glass fiber production.

12. The device according to claim 11, wherein a mass flow controller is present to control each of the two carrier gas streams into the mixing unit to set a target pressure and temperature of the mixed carrier gas stream.

13. The device according to claim 11, wherein the device does not have a mass flow controller.

14. The device according to claim 11, wherein a heatable piping system is provided between the mixing chamber and the reaction chamber.

15. The method according to claim 1, wherein the mixed gas stream comprises oxygen, halide vapor and additional gas(es) and is passed after the mixing chamber through a heated conduit system to the reaction chamber with the substrate tube.

16. The method according to claim 1, wherein the temperature T1 is less than the temperature T3.

17. The device according to claim 11, wherein the device does not have a device to control the pressure of the mixed carrier gas stream downstream of the vaporizer.

18. The device according to claim 11, wherein the mixing unit is arranged in a temperature-controllable unit so that a temperature of the mixed carrier gas stream can be kept constant.

* * * * *